United States Patent
Trolliet et al.

(10) Patent No.: US 11,277,063 B2
(45) Date of Patent: Mar. 15, 2022

(54) MOTOR COMPONENT FOR A LINEAR MOTOR

(71) Applicant: KESSLER ENERGY GMBH, Bad Buchau (DE)

(72) Inventors: Patrick Trolliet, Altshausen (DE); Markus Sinner, Eriskirch (DE)

(73) Assignee: Kessler Energy GmbH, Bad Buchau (DE)

(*) Notice: Subject to any disclaimer, the term of this patent is extended or adjusted under 35 U.S.C. 154(b) by 57 days.

(21) Appl. No.: 16/748,964

(22) Filed: Jan. 22, 2020

(65) Prior Publication Data

US 2020/0161957 A1 May 21, 2020

Related U.S. Application Data

(63) Continuation of application No. PCT/EP2017/073952, filed on Sep. 21, 2017.

(51) Int. Cl.
   *H02K 41/02* (2006.01)
   *H02K 41/035* (2006.01)
   *H02K 9/197* (2006.01)

(52) U.S. Cl.
   CPC ......... *H02K 41/0356* (2013.01); *H02K 9/197* (2013.01); *H02K 2201/09* (2013.01)

(58) Field of Classification Search
   CPC ...... H02K 41/02; H02K 41/03; H02K 41/031; H02K 9/197
   See application file for complete search history.

(56) References Cited

U.S. PATENT DOCUMENTS

| | | | |
|---|---|---|---|
| 6,787,942 B2 * | 9/2004 | Lilie | H02K 1/12 310/12.01 |
| 2003/0141769 A1 | 7/2003 | Kubo | |
| 2015/0061416 A1 * | 3/2015 | Kainuma | H02K 9/02 310/12.18 |

FOREIGN PATENT DOCUMENTS

| | | |
|---|---|---|
| DE | 10 2009 017 549 A1 | 10/2010 |
| JP | 2002-044928 A1 | 2/2002 |

OTHER PUBLICATIONS

International Search Report and Written Opinion (Application No. PCT/EP2017/073952) dated Oct. 30, 2017.

* cited by examiner

*Primary Examiner* — Dang D Le
(74) *Attorney, Agent, or Firm* — Burr & Brown, PLLC

(57) ABSTRACT

A motor component for a linear motor having a first primary part with two first electromagnetic coils and a second primary part with two second electromagnetic coils, arranged substantially parallel in relation to one another. At least one common laminated core unit is provided for the first and the second primary parts, which common laminated core unit comprises one-piece sheet-metal elements. Each of the one-piece sheet-metal elements of the laminated core unit in each case has first recesses, which are arranged one behind the other in the longitudinal direction of an adjustment path of the linear motor, for the first coils of the first primary part and at second recesses, which are arranged one behind the other in the longitudinal direction of the adjustment path of the linear motor, for the second coils of the second primary part.

9 Claims, 3 Drawing Sheets

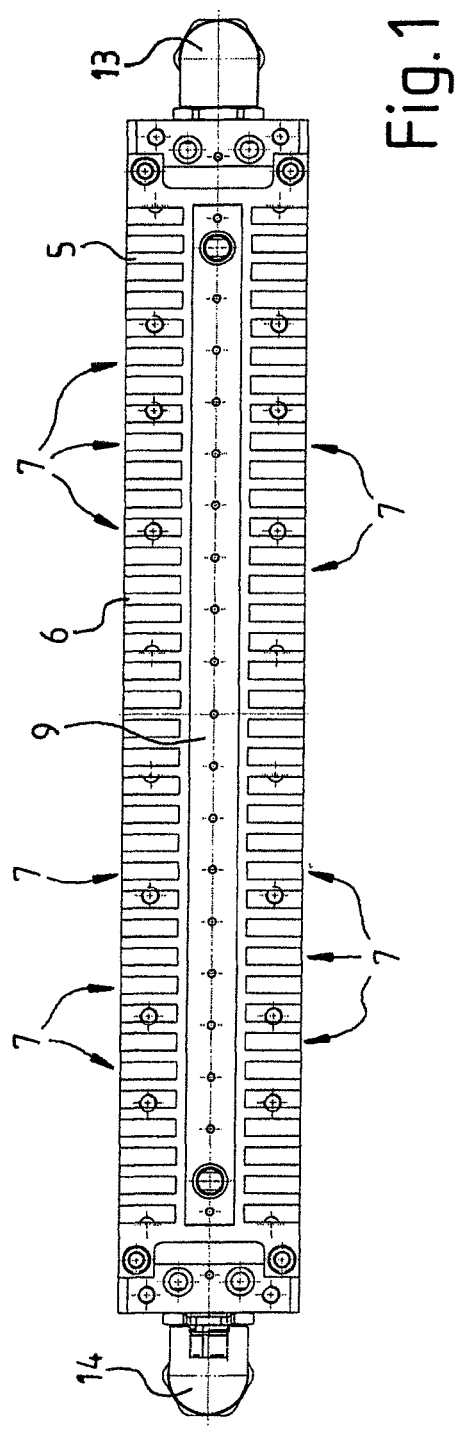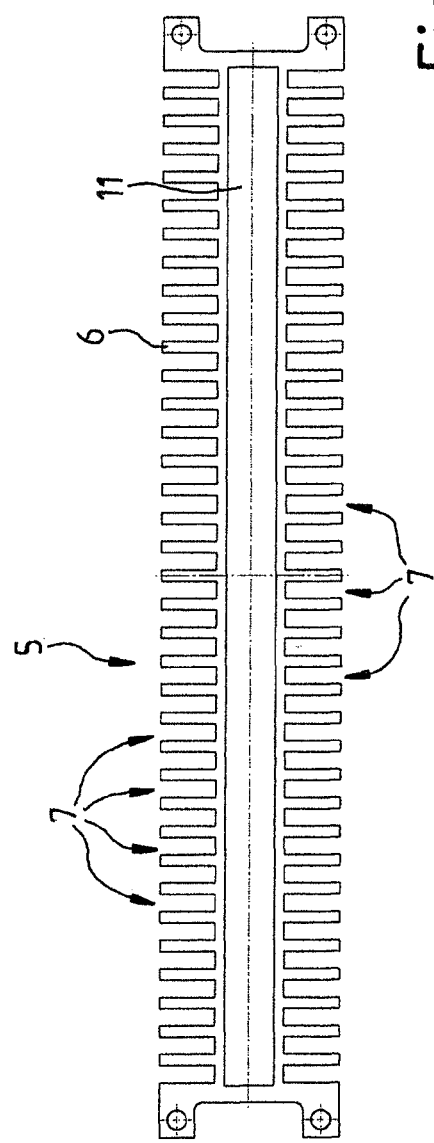

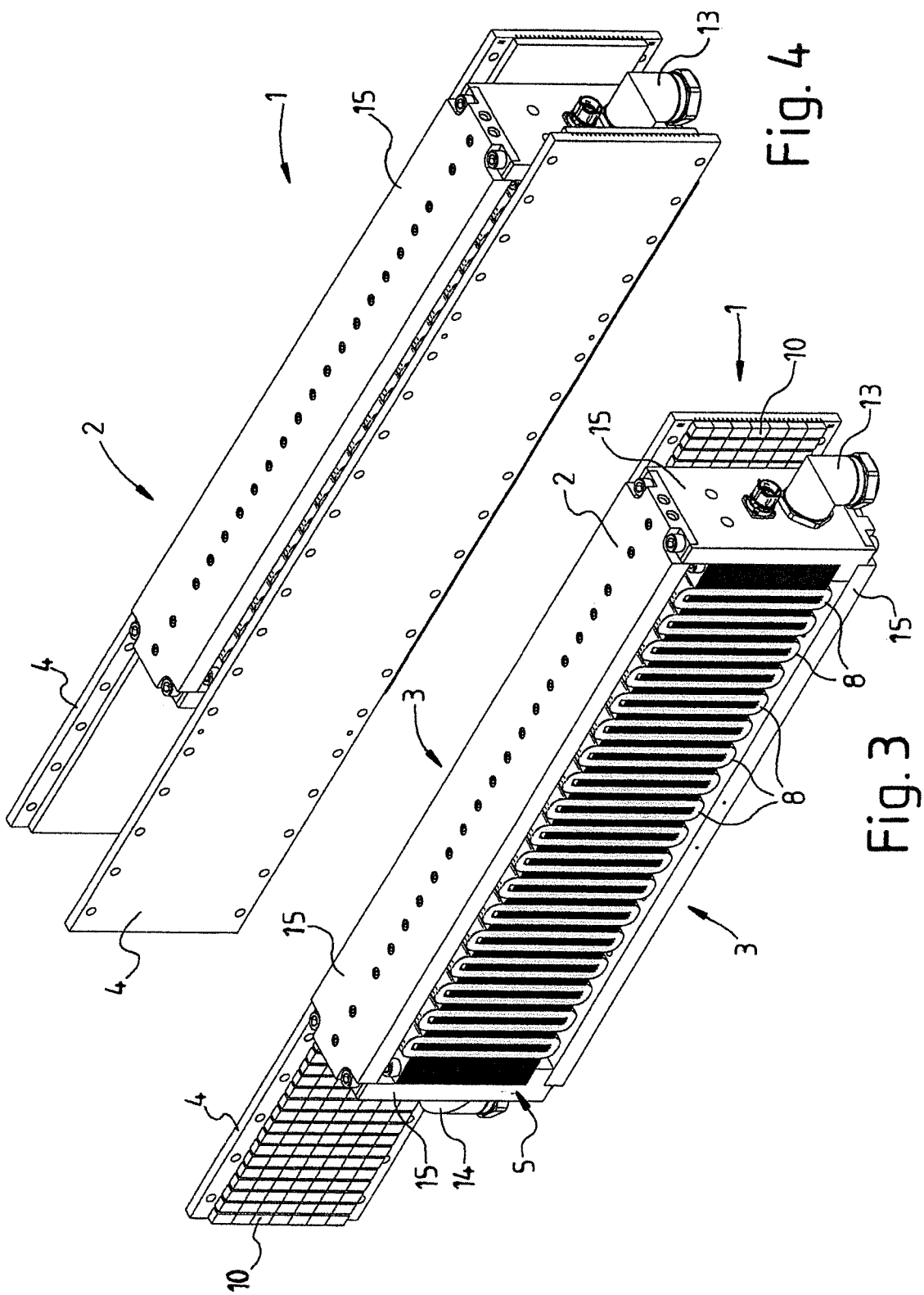

MOTOR COMPONENT FOR A LINEAR MOTOR

CROSS REFERENCE TO RELATED APPLICATIONS

This application is a continuation of International Application No. PCT/EP2017/073952 filed Sep. 21, 2017, which designated the United States, the entirety of which is incorporated herein by reference.

FIELD OF THE INVENTION

The present invention relates to a motor component for a linear motor and to a linear motor.

BACKGROUND OF THE INVENTION

A very wide variety of linear motors are already commercially available. Their increasing importance in mechanical engineering and plant engineering is due, inter alia, to the high accelerations and speeds which can be realized, and also to their high positioning accuracy and long adjusting travels which can be realized.

Linear motors usually comprise at least one so-called primary part, a plurality of coils, through which current flows, generating a variable and/or controllable magnetic field, and at least one so-called secondary part which has a multiplicity of permanent magnets. The adjusting travel is generated by way of changes in the magnetic field, a relative movement/adjustment between the secondary part and the primary part being realized.

In order to increase the propulsive force, linear motors having, for example, two separate primary parts, that is to say two separate coil arrangements, and/or two separate secondary parts, that is to say two separate permanent magnet arrangements, are already known (cf. DE 10 2009 017 549 A1).

It is disadvantageous here, however, that motors of this type are comparatively voluminous, complex and economically unfavorable.

SUMMARY OF THE INVENTION

In contrast, it is an object of the present invention to propose a linear motor or a motor component for a linear motor of the type mentioned at the outset, which eliminates the disadvantages of the prior art at least partially.

Accordingly, a motor component according to the present invention for a linear motor is distinguished by the fact that at least one common laminated core unit which comprises single-piece lamination elements is provided for the first and the second primary part, and that each of the single-piece lamination elements of the laminated core unit has in each case at least three first recesses for the first coils of the first primary part, which first recesses are arranged behind one another in the longitudinal direction of an adjusting travel of the linear motor, and at the same time at least three second recesses for the second coils of the second primary part, which second recesses are arranged behind one another in the longitudinal direction of the adjusting travel of the linear motor.

With the aid of the motor component according to the present invention for a linear motor, it is made possible that considerably fewer components are required. The linear motor or the motor component can also be of substantially smaller or more compact construction and can additionally be produced and operated less expensively in comparison with the prior art with an approximately identical drive power or propulsive force. In addition, synergetic effects can be utilized in the case of the energy and/or heat management, with the result that a more energy-efficient mode of operation can be realized.

The respective single-piece lamination elements of the laminated core unit are preferably aligned at least in the longitudinal direction of the adjusting travel of the linear motor. This achieves a situation where the length of the lamination elements or the laminated core unit can be adapted in an advantageous way to the length of the adjusting travel. Accordingly, a short or optionally also very long adjusting travel can be realized by way of only a single, single-piece lamination element or the laminated core unit according to the present invention. For adjusting travels or lamination elements of different length, merely a different number of (identical) coils and/or magnets are to be provided. In this way, a modular range with a very wide variety of lamination elements or laminated core units and therefore a very wide variety of primary parts or motor components can be realized in accordance with the present invention. This additionally improves the economic efficiency of the present invention, especially even for a very wide variety of applications and/or performance categories and/or adjusting travel lengths.

A laminated core unit in accordance with the present invention generally advantageously consists of combined individual laminations or lamination elements which are insulated electrically with respect to one another, in order to avoid eddy currents which might be generated inductively therein if a corresponding body which is intended to conduct the field lines and to strengthen the magnetic field were configured from a ferromagnetic solid material. The coils or windings and/or corresponding permanent magnets are preferably arranged in recesses or grooves in the laminated core unit or the lamination elements.

In one particular development of the present invention, the respective single-piece lamination elements of the laminated core unit are adhesively bonded to one another. In the case of one advantageous design variant of the present invention, the laminated core unit can be configured as a baked lacquer laminated core. In this way, the mechanical rigidity of the laminated core unit can be increased decisively. This results in a structural unit which can be handled in one piece as an adhesively bonded laminated core unit which is particularly stable/rigid mechanically.

In addition, at least one baked lacquer winding or coil comprising (copper) wires which are adhesively bonded/connected with baked lacquer can be arranged in the recesses or grooves, which baked lacquer winding or coil is advantageously sealed. As a result, the mechanical rigidity of the primary part or the motor component according to the present invention is thus additionally increased.

Moreover, it is conceivable in the case of one advantageous embodiment that, instead of wire which is coated with baked lacquer, conventionally insulated winding wire is also used. In the case of one preferred exemplary embodiment, baked lacquer coils which are wound orthocyclically are provided as windings. Otherwise, although round wire which therefore has a substantially round cross section is often used, a square wire or the like can also fundamentally be used, for example. The cross section can play a role, in particular, when the aim is to achieve as high a winding density as possible. By way of windings which are packed as densely as possible, fields which are as high as possible can be generated with a space requirement which is as low as possible, as a result of which the performance of the motor can be increased.

In one preferred variant of the present invention, at least one cooling recess for cooling the first and/or second primary part is arranged between the first and the second recesses and/or between the first and the second coils and/or between the first and the second primary part, at least one cooling unit preferably being arranged in the cooling recess. In this way, heat losses can advantageously be dissipated. The advantageous arrangement of the cooling means according to the present invention makes a particularly space-saving and/or compact design of the motor component or the linear motor according to the present invention possible.

In addition, very short paths for the dissipation of waste heat can be realized. That is to say, excess heat of the primary part/parts or motor component has merely very short paths until it is dissipated or cooled by means of the cooling mechanism. This improves the efficiency of the energy and/or heat management of the motor component or the linear motor.

The present invention is distinguished by the fact that the cooling unit or the cooling element is connected (fixedly) to the laminated core or the laminated core unit and is arranged parallel to the arrangement of the grooves, the laminated core and the cooling element advantageously being adhesively bonded to one another.

The advantageous arrangement in one plane parallel to the grooves/recesses fundamentally makes it possible that the cooling element can be arranged close to the respective windings/coils, possibly even at a constant or substantially constant spacing from the windings, with the result that homogeneous cooling is made possible.

Moreover, particularly inexpensive manufacturing can be achieved because the two parts (the laminated core and the cooling element) can (first of all) be manufactured as separate parts, with the result that corresponding cooling ducts do not have to be made in the material which consists of individual laminations, which is comparatively complex. Secondly, on account of the proposed design, the materials can be connected to one another in a simple way, but nevertheless without air gaps or other circumstances which impede the thermal conduction.

An advantageous connection between the laminated core and the cooling element is surprisingly made possible by way of adhesive bonding, the adhesive bonding taking place, in particular, by way of a very thin adhesive layer (which conducts heat as efficiently as possible).

Firstly, the spacing between the laminated core and the cooling element can be very small as a result, which aids a satisfactory dissipation of heat. Secondly, it is made possible as a result that a very stable connection is achieved between the laminated core and the cooling element. This can surprisingly withstand even very high forces which act generally on an active part of a motor during operation.

Moreover, air gaps between the cooling element and the laminated core can be avoided in the case of the proposed construction. Although some adhesives can fundamentally certainly have even poor heat conducting properties, it proves to be advantageous in the present case that the adhesive layer itself can be of merely very thin configuration and the thermal resistance which is caused by it, therefore, tends to be low.

In order to achieve as great a contact area as possible between the laminated core and the cooling element, at least one of the two objects, or both of the two objects, can be configured in each case as a plate or a layer/structure of substantially homogeneous thickness, with the result that cooling element ducts and windings which are arranged in the recesses/grooves of the laminated core as heat source can run in parallel planes.

Furthermore, a particularly small spacing of the ducts and the windings from one another is also made possible, with the result that a satisfactory and homogeneous dissipation of heat is made possible overall.

In the case of one preferred development of the present invention, the laminated core and the cooling element can advantageously be connected to one another in a sandwich design. In addition to the short spacings between heat-generating windings and heat-dissipating cooling ducts, it is made possible, moreover, that the mechanical rigidity is increased, since the corresponding "sandwich layers" stabilize each other mutually and ensure a higher bending moment or geometrical moment of inertia. According to the present invention and also according to the exemplary embodiment under discussion with a construction of sandwich design, further advantages are provided in comparison with a conventional construction according to the prior art which often provides for sealing of the primary part; according to the prior art, it has namely proved to be disadvantageous that air inclusions can often be found in the sealing material.

As has already been mentioned above, the cooling unit or the cooling element can advantageously have at least one duct for conducting cooling liquid, in particular, of a closed cooling circuit. Water, for example, can be used as cooling liquid. In the case of one preferred exemplary embodiment of the present invention, a cooling duct of this type can advantageously be arranged in such a way that it penetrates the surface of the cooling element or the cooling unit in a manner which is as homogeneous and sealed as possible, which surface lies parallel to the plane, in which the recesses/grooves are arranged, with the result that a dissipation of heat which is as uniform and homogeneous as possible can be achieved. For example, a cooling duct of this type can have a meandering course in a plate. It is also conceivable that a plurality of cooling ducts penetrate the plate.

The cooling unit preferably has at least one cooling duct section in a meandering shape. This advantageously extends the cooling path of the cooling medium or of the cooling circuit, and, therefore, improves the dissipation of heat.

When, in particular, the corresponding cooling element is not penetrated by cooling ducts on a straight path, it is advantageous for corresponding cooling ducts to be milled into a plate, for example, in particular, parallel to the plane, in which the grooves are arranged. In order to in turn close off the cooling ducts in a sealed manner, in a case of this type a cover can be provided which is fastened on that side of the plate or the cooling element, on which the open sections of the cooling ducts are situated. The cover can be manufactured inexpensively as an individual part.

In order to connect the laminated core and the cooling element to one another, a temperature-resistant adhesive is preferably used, since relatively high temperatures can be achieved in part during operation of the motor and it is necessary precisely at this moment that there is nevertheless a satisfactory mechanical bond between the cooling element and the laminated core. For this reason, for example, various temperature-resistant adhesives can be used, in particular, a two-component adhesive on an epoxy resin basis. In order to establish a stable layer which means a low resistance in thermal terms, an adhesive layer with a thickness of at most 0.25 mm can be provided, in particular.

For the satisfactory dissipation of heat and in order at the same time to obtain a comparatively low weight of the motor component, the cooling element can be manufactured, for example, from aluminum. Moreover, the material is comparatively inexpensive.

In conjunction with one advantageous embodiment, in the case of which the cooling ducts are let into the cooling element, it has already been explained that this open region of the cooling ducts should be covered, which can take place, for example, with the aid of a cover and/or sealing element, in particular, a sealing ring. When, above all, the cooling element itself is manufactured from aluminum, the cover can advantageously likewise be manufactured from aluminum, which has the advantage, inter alia, that the cover and the cooling element therefore have the same or at least a very similar coefficient of thermal expansion in the case of heating, and accordingly both also behave identically in the case of identical heating and mechanical stresses do not occur. A cover represents an inexpensive variant for covering and for closing the entirety of the cooling ducts, a rubber ring or the like preferably being used as seal.

Should the cooling ducts be flowed through, however, by a liquid, on which a particularly high pressure acts, there is fundamentally the possibility that the cover might bulge upward, in particular, if it comprises a comparatively thin material in relation to the remaining cooling element. As a rule, the cover can be manufactured, for example, from a flat metal sheet. In this case, it is possibly not sufficient to fasten the cover merely to the edges of the cooling element, as is also often provided in the prior art, in particular.

At least one primary part frame is advantageously provided to receive the first and second primary part and/or the laminated core unit and/or the cooling unit. In this way, a particularly stable/rigid motor component according to the invention can be realized.

In the case of one particularly preferred development of the present invention, the cover is fastened on the plate of the cooling element by way of friction stir welding, in order for it to be possible for the mechanical stability at high pressures of the cooling liquid which flows through the duct to be increased and, furthermore, for the mechanical rigidity to be increased. One variant is particularly preferred, the case of which the cover is fastened on the plate of the cooling element in such a way that the at least one duct is surrounded at least partially, in particular, completely by the weld path. This means that, in the case of cooling duct sections which lie in parallel, a weld path also lies at least partially between the cooling duct sections as a rule.

In the case of friction stir welding, in the welding stud of the welding tool is turned or is set in rotation and is pressed into the material in the process until the welding shoulder is seated on the material. While the welding stud turns further, the welding tool is guided along the weld path to be welded, the material being changed into a pasty state, that is to say becoming plastic and being capable of being processed. A fine-grained connecting region is produced between the two workpieces which are to be connected to one another. Only a small input of heat advantageously takes place, with the result that the workpiece is treated with care, whereas excellent, very stable connection properties can be achieved, however.

BRIEF DESCRIPTION OF THE DRAWINGS

One exemplary embodiment of the present invention is shown in the drawing and will be described in greater detail in the following text on the basis of the figures, in which, in detail:

FIG. 1 diagrammatically shows a plan view of a motor component for a linear motor according to the present invention;

FIG. 2 diagrammatically shows a plan view of a lamination or laminated core of the motor component according to FIG. 1;

FIG. 3 diagrammatically shows a partially exposed linear motor having the motor component according to FIG. 1 and having a secondary part;

FIG. 4 diagrammatically shows the linear motor having the motor component according to FIG. 1 and having the two secondary parts.

DETAILED DESCRIPTION OF THE INVENTION

Figure 5:
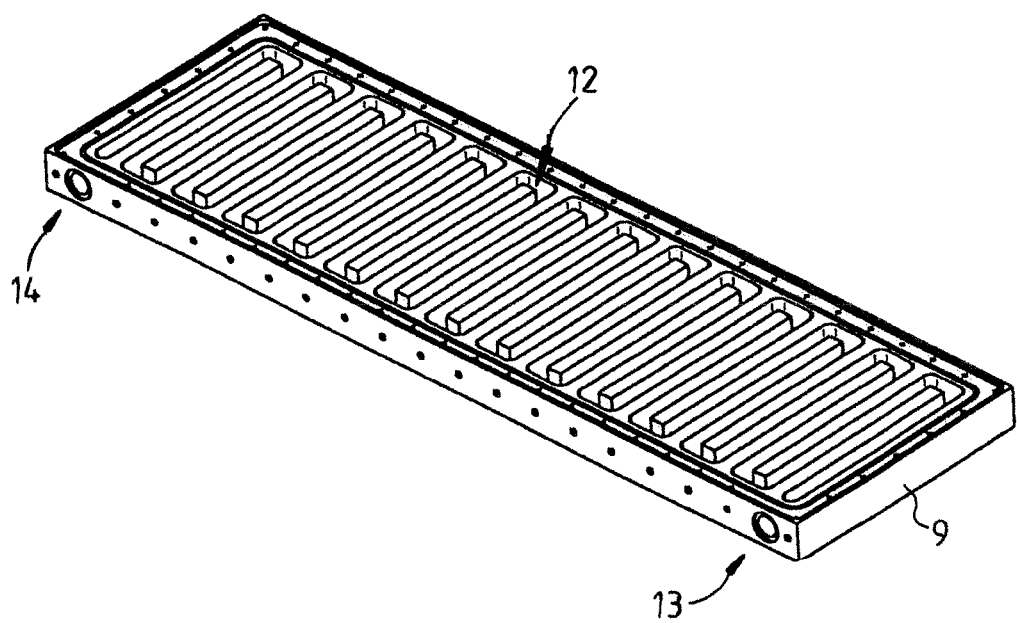
FIG. 5 diagrammatically shows a cooling unit of the motor component according to FIG. 1 in a perspective view.

The figures diagrammatically show a motor component 2 for a linear motor 1 having two primary parts 3 and two secondary parts 4 which are fitted with permanent magnets 10. According to the present invention, the motor component 2 for a linear motor 1 comprises a laminated core 5 which is assembled from numerous single-piece laminations 6. In advantageous recesses 7 or grooves 7 on a first longitudinal side, the laminations 6 or the laminated core 5 receive/receives first coils 8 for a first primary part 3 and, in advantageous recesses 7 or grooves 7 on a second longitudinal side, receive/receives second coils 8 for a second primary part 3. This means that, as illustrated in FIG. 4, in particular, the two primary parts 3 with the coils 8 are arranged between two secondary parts 4. The motor component 2 is configured as a single-piece structural unit 2 and additionally comprises the laminated core 5 according to the present invention. Moreover, very stable/rigid frame 15 of the motor component 2 or of the linear motor 1 is provided.

It becomes clear in FIGS. 1 and 2, above all, how a cooling unit 9 is arranged or is advantageously adhesively bonded in a recess 11 of the laminations 6 or the laminated core 5. In this way, an advantageous "sandwich design" of the motor component 2 or the linear motor 1 is realized. It is additionally illustrated here that a particularly compact and very short thermal bridges or thermal conducting paths can be realized between the coils 8, that is to say the recesses 7 or the grooves 7, and the cooling unit 9 or cooling element 9. This not only leads to very satisfactory thermal management, but rather also to a very stable/rigid motor component 2 and, in addition, to a very space-saving, efficient and inexpensive production and operating method of the motor component 2 or the linear motor 1 according to the present invention.

The central arrangement of the cooling unit 9 or of a cooling element 9 with cooling ducts 12 of meandering configuration is illustrated, above all, in FIG. 5. The cooling element 9 has connectors 13, 14 in the installed state, with the result that an advantageous coolant throughflow or cooling circuit can be realized. Advantageous seals or elastomer seals/sealing rings or the like can be arranged between the cooling unit 9 or the cooling element 9 and the laminated core 5.

LIST OF DESIGNATIONS

Linear motor
Motor component
Primary part
Secondary part

Laminated core
Lamination
Recess
Coil
Cooling unit
Magnet
Recess
Cooling duct
Connector
Connector
Frame

The invention claimed is:

1. A motor component for a linear motor, comprising at least one cooling recess, at least one cooling unit, at least one first primary part, which has at least two first electromagnetic coils, and one second primary part, which has at least two second electromagnetic coils, the first and the second primary parts being arranged substantially parallel to one another, wherein at least one common laminated core unit which comprises single-piece lamination elements is provided for the first and the second primary part, wherein each of the single-piece lamination elements of the laminated core unit has in each case at least three first recesses for the first coils of the first primary part, which first recesses are arranged behind one another in the longitudinal direction of an adjusting travel of the linear motor, and at least three second recesses for the second coils of the second primary part, which second recesses are arranged behind one another in the longitudinal direction of the adjusting travel of the linear motor, wherein the at least one cooling recess that is for cooling the first primary part and/or the second primary part is arranged between the first and the second recesses and/or between the first and the second coils and/or between the first and the second primary parts in the lamination core unit, with the at least one cooling unit, which has at least one channel for conducting a cooling liquid, being arranged in the cooling recess, and
wherein the cooling recess in the lamination core unit and the cooling unit in each case is designed as a late structure or an essentially uniformly thick layer structure, so that the cooling channel in the cooling unit and windings that are arranged in the first and the second recesses of the laminated core unit as a heat source are arranged in parallel planes, such that the laminated core unit and the cooling unit are connected to one another in a sandwich construction.

2. The motor component as claimed in claim 1, wherein the respective single-piece lamination elements of the laminated core unit are aligned at least in the longitudinal direction of the adjusting travel of the linear motor.

3. The motor component as claimed in claim 1, wherein the respective single-piece lamination elements of the laminated core unit are adhesively bonded to one another.

4. The motor component as claimed in claim 1, wherein the cooling unit is configured as part of a substantially closed liquid cooling circuit.

5. The motor component as claimed in claim 1, wherein the cooling unit has at least one cooling duct section in a meandering shape.

6. The motor component as claimed in claim 1, further comprising at least one primary part frame to receive the first and second primary parts and/or the laminated core unit and/or the cooling unit.

7. A linear motor having at least one motor component as claimed in claim 1.

8. The linear motor as claimed in claim 1, further comprising at least one first secondary part which has first magnets and one second secondary part which has second magnets, at least the first and the second primary parts with the laminated core unit being arranged between the first and the second secondary parts.

9. A motor component for a linear motor, comprising at least one common laminated core unit, a substantially rectangular box shaped cooling unit, at least one first primary part, which has at least two first electromagnetic coils, and one second primary part, which has at least two second electromagnetic coils, the first and the second primary parts being arranged substantially parallel to one another, wherein the laminated core unit that comprises single-piece lamination elements is provided for the first and the second primary part, wherein
    each of the single-piece lamination elements of the laminated core unit has in each case at least three first recesses for the first coils of the first primary part, which first recesses are arranged behind one another in the longitudinal direction of an adjusting travel of the linear motor, and at least three second recesses for the second coils of the second primary part, which second recesses are arranged behind one another in the longitudinal direction of the adjusting travel of the linear motor, and
  the substantially rectangular box shaped cooling unit, which has elongated sides that extend linearly in the longitudinal direction of the adjusting travel of the linear motor, is arranged in and fixedly connected to a corresponding rectangular box shaped recess in a center region of the laminated core unit so as to be centrally arranged between the first primary part and the second primary part, and the elongated sides of the substantially rectangular box shaped cooling unit are arranged parallel to the first and the second recesses that are arranged behind one another in the longitudinal direction of the adjusting travel of the linear motor.

* * * * *